(No Model.)

J. SOVEREIGN.
SHOULDER CUTTER FOR VEHICLE AXLES.

No. 507,389. Patented Oct. 24, 1893.

Witnesses:

Inventor
Joshua Sovereign

UNITED STATES PATENT OFFICE.

JOSHUA SOVEREIGN, OF WOODLAND, CALIFORNIA.

SHOULDER-CUTTER FOR VEHICLE-AXLES.

SPECIFICATION forming part of Letters Patent No. 507,389, dated October 24, 1893.

Application filed May 5, 1893. Serial No. 473,147. (No model.)

*To all whom it may concern:*

Be it known that I, JOSHUA SOVEREIGN, a citizen of the United States, residing at Woodland, Yolo county, State of California, have invented an Improvement in Shoulder-Cutters for Vehicle-Axles; and I hereby declare the following to be a full, clear, and exact description of the same.

My invention relates to a device for cutting shoulders upon the outer ends of vehicle axles when the latter are too long for the axle boxes. It consists in certain details of construction which will be more fully explained by reference to the accompanying drawings, in which—

Figure 1:
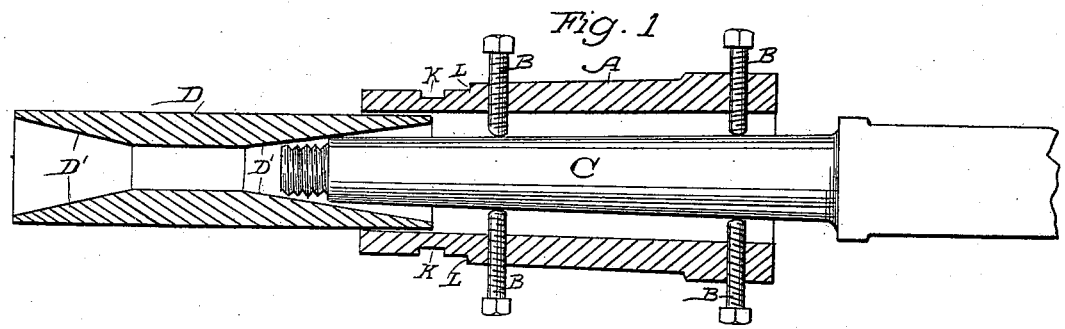
Figure 2:
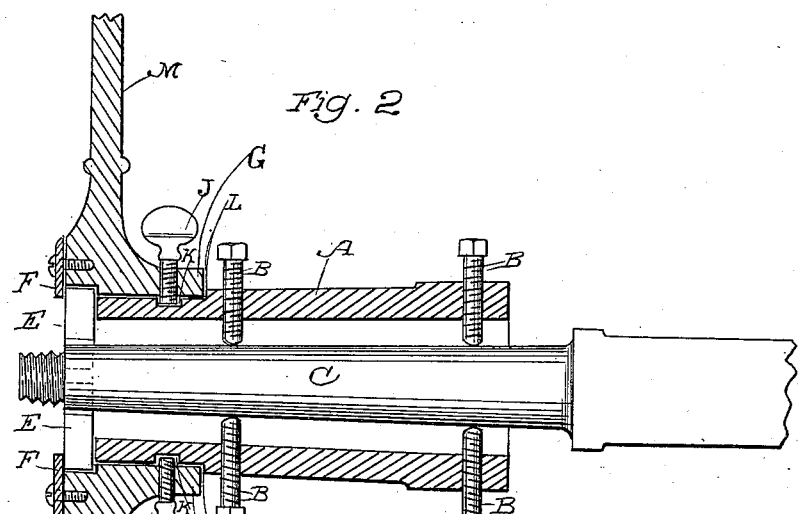
Figure 3:
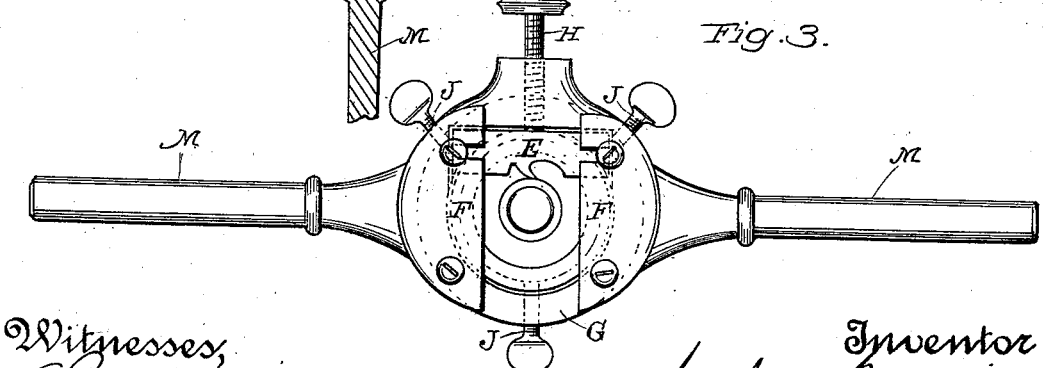

Figure 1 is a vertical longitudinal section showing the manner of applying and centering the device upon the axle. Fig. 2 is a similar section showing the cutter in place. Fig. 3 is a front view of the cutter.

The object of my invention is to provide an apparatus for cutting shoulders upon the outer ends of vehicle axles, and a means for accurately adjusting and centering the apparatus upon the axle to be cut.

In the drawings, A is a sleeve of larger diameter than the axle having the interior end tapered correspondingly with the taper of the axle, and B B are screws passing through the sleeve in radial lines. These screws may be three or four in number, and are screwed in until they rest against the axle and thus support the sleeve firmly around the axle.

In order to adjust the sleeve and center it accurately with relation to the outer end of the axle C which is to be cut, I employ a supplemental sleeve D which fits accurately into the outer end of the sleeve A which latter is made cylindrical for a short distance for this purpose. The interior of the sleeve D, near its central portion, is of smaller diameter than the outer end of the axle, and the ends of the sleeves are bored conically as shown at D' so that when the sleeve D has been introduced into the outer end of the sleeve A, the cone-shaped interior will form a bearing upon the outer end or shoulder of the axle, and will thus center the axle accurately within the sleeve A. The screws B may then be turned in until their points abut against the axle, as before described, and the axle will be accurately centered. After this is done, the sleeve D is withdrawn from the sleeve A, and the rotating sleeve G which carries the cutter E is fitted upon the outer end of the sleeve A, around which it is turned, while the cutter is advanced and the shoulder is cut upon the axle. The cutter E is adapted to slide between transverse guides F which are fixed upon the outer end of a sleeve G. Through the side of this sleeve passes a screw H having a hand wheel or device I by which it may be turned. The point of this screw impinges against the back of the cutter bar E and when turned inwardly, will force the cutter to move within its guides F toward the center of the sleeve G. This sleeve G has screws J passing through it, as shown, and the points of these screws are adapted to fit in a circular channel K which is made around the sleeve A near its outer end. The sleeve A is also turned smaller at this point having a shoulder at L against which the inner end of the sleeve G abuts when said sleeve is in position, and the screws J being turned until their points enter the groove or channel K, it will be manifest that the sleeve G may then be rotated around the end of the sleeve A by means of its handles M which project from the outer end of the sleeve as shown. It will be manifest that when this sleeve G is turned around, the cutter E will be rotated with it, and when advanced toward the center by means of the screw H, it will cut away any portion of the end of the axle which projects so as to be in line with the line of advance of the cutter. The amount to be cut off the end of the axle is determined by the position of the sleeve A upon the axle, and the end of the latter is allowed to project beyond the end of the sleeve A sufficiently to enable the cutter to act upon it when the sleeve G is rotated, and thus form a new shoulder against which the nut or washers which hold the wheel in place, abut, and the end shake caused by the wear of the box or axle will thus be taken up.

Having thus described my invention, what I claim as new, and desire to secure by Letters Patent, is—

1. A shoulder cutter for vehicle axles consisting of a sleeve adapted to embrace the axle, a second sleeve with conically bored ends by which the axle is exactly centered within the first sleeve, radial adjusting screws passing through the sleeves with the inner ends adapted to press upon the axle and support the sleeve therefrom, a third sleeve fitting around the outer end of the first named sleeve, screws mounted in the third sleeve, a channel surrounding the end of the first sleeve, into which the points of said screws are fitted whereby the outer sleeve is retained in position and allowed to be rotated about the inner one, a transversely moving cutter, guides upon the outer end of the rotatable sleeve within which said cutter is movable, and a screw by which it is moved toward the center while the sleeve is being rotated, substantially as herein described.

2. A device for centering axles and cutting shoulders thereon consisting of a sleeve adapted to loosely inclose the axle, a second sleeve fitting, and slidable in the outer end of the first named sleeve and having the end bored conically to embrace the end of the axle whereby the latter is accurately centered within the sleeves, radial screws adjustable in the first named sleeves so that their inner ends abut against the axle after it is centered, an exterior sleeve, rotatable upon the outer end of the sleeve which is fixed to the axle after the removal of the centering sleeve, and a cutter and feed screw carried by the rotating sleeve, substantially as herein described.

In witness whereof I have hereunto set my hand.

JOSHUA SOVEREIGN.

Witnesses:
S. H. NOURSE,
J. A. BAYLESS.